(12) United States Patent
Elisha et al.

(10) Patent No.: US 11,282,394 B2
(45) Date of Patent: Mar. 22, 2022

(54) METHODS AND SYSTEMS FOR SPATIAL CLUSTERING BASED ON MOBILITY DATA

(71) Applicant: HERE GLOBAL B.V., Eindhoven (NL)

(72) Inventors: Oren Elisha, Raanana (IL); Yam Kaspi, Raanana (IL); Ofri Rom, Tiqwa (IL)

(73) Assignee: HERE Global B.V., Eindhoven (NL)

(*) Notice: Subject to any disclaimer, the term of this patent is extended or adjusted under 35 U.S.C. 154(b) by 5 days.

(21) Appl. No.: 16/290,601

(22) Filed: Mar. 1, 2019

(65) Prior Publication Data

US 2020/0279491 A1 Sep. 3, 2020

(51) Int. Cl.
*G08G 1/00* (2006.01)
*G06F 17/16* (2006.01)
*G06F 16/29* (2019.01)
*H04W 4/021* (2018.01)

(52) U.S. Cl.
CPC .............. *G08G 1/207* (2013.01); *G06F 16/29* (2019.01); *G06F 17/16* (2013.01); *H04W 4/021* (2013.01)

(58) Field of Classification Search
CPC ..................................................... G08G 1/207
See application file for complete search history.

(56) References Cited

U.S. PATENT DOCUMENTS

| | | | |
|---|---|---|---|
| 2017/0193404 A1* | 7/2017 | Yoo | H04W 4/024 |
| 2018/0032928 A1* | 2/2018 | Li | G06Q 10/02 |
| 2019/0012571 A1* | 1/2019 | Ahafonkin | G01C 21/32 |
| 2020/0034655 A1* | 1/2020 | Gupta | G06N 20/00 |
| 2020/0249047 A1* | 8/2020 | Balva | G01C 21/3492 |

* cited by examiner

*Primary Examiner* — Imran K Mustafa
(74) *Attorney, Agent, or Firm* — Ditthavong, Steiner & Mlotkowski (57) ABSTRACT

Various aspects of a method, a system, and a computer program product are disclosed herein in accordance with at least one example embodiment for spatial clustering of a plurality of cells of a geographical location. The method may include generation of cell clusters based on multiple criteria. The method may further include reception of mobility data from one or more external devices associated with the plurality of cells. The mobility data may be further processed to extract observations for generation of feature vectors from the observations. The feature vectors may be normalized to generate one or more clusters of a set of cells of the location. Cluster data associated with the clustering of the plurality of cells may be further used in one or more location based applications.

19 Claims, 7 Drawing Sheets

METHODS AND SYSTEMS FOR SPATIAL CLUSTERING BASED ON MOBILITY DATA

TECHNOLOGICAL FIELD

The present disclosure generally relates to a field of spatial data mining, and more particularly to a system, a method and a computer program product of spatial clustering based on mobility data.

BACKGROUND

Clustering is a descriptive task that seeks to identify homogeneous groups of objects based on the values of attributes of the objects. In spatial data sets, clustering permits a generalization of the spatial component, like explicit location and time stamps that define implicit relations of spatial neighborhood of spatial data sets. Typically, clustering techniques utilize input data received from one or more sources to process the input data for generation of one or more spatial clusters.

The spatial cluster data may play an important role in function of one or more location based applications. Such one or more location based applications may include prediction and optimization solutions that are based on input data. The input data may include maps data, and cellular data that may be used to assess and categorize locations, cells or sections of a geographical location with certain demand and supply calculation. Systems and methods with such prediction and optimization solutions may not be granular. As a result, such systems and methods may be inaccurate and hence unreliable to obtain insights from the input data for various applications, one such category of applications may include the location based applications.

BRIEF SUMMARY

A method, a system, and a computer program product are provided in accordance with an example embodiment described herein for clustering of a plurality of cells of one or more geographical locations. Clustering of the plurality of cells of one or more geographical locations may be alternatively referred to as spatial clustering based on mobility data.

Embodiments of the disclosure provide a method for spatial clustering based on mobility data. The method may include steps of receiving mobility data associated with the plurality of cells. The mobility data may include one or more of pick-up event data, drop-off event data or point of interest data associated with the plurality of cells. The method may further include extracting, by one or more processors, one or more feature vectors from the received mobility data. Such extraction of the one or more feature vectors may be based on aggregation of two or more observations associated with the received mobility data. Further, the method may include a step of spatial clustering, by the one or more processors, by clustering the plurality of cells. Such clustering of the plurality of cells may be based on the extracted one or more feature vectors, to generate one or more clusters of the plurality of cells.

According to one embodiment of the disclosure, the method may include a step of receiving the mobility data from one or more of user devices, vehicles, or external databases. Further, the point of interest data may include one or more of private event data, public event data, public transportation scheduled data, traffic data, parking event data or trajectory data.

According to one embodiment of the disclosure, the extraction of the one or more feature vectors include the steps of extracting a plurality of numeric attributes from the aggregated two or more observations. The plurality of numeric attributes may include numerical data associated with one or more of counts, mean, max or frequency associated with the mobility data and representing each of the plurality of numeric attributes into the at least one feature vector.

According to one embodiment of the disclosure, normalizing each of the one or more feature vectors may be based on one or more of length normalization, mean and standard normalization, or category normalization.

According to one embodiment of the disclosure, clustering the plurality of cells may be based on a count clustering method. The plurality of cells may be clustered as one or more of low value, medium value, or high value cells. Such clustering of cells may be based on a threshold value of sum of counts of the one or more feature vectors.

According to one embodiment of the disclosure, clustering the plurality of cells of the one or more geographical regions may be based on a k-means clustering technique. Also, according to another embodiment of the disclosure, clustering the plurality of cells of the one or more geographical region may be based on a density based special clustering algorithm Embodiments of the disclosure provide a system for spatial clustering based on mobility data. The system may include at least one memory configured to store computer program code instructions and at least one processor configured to execute the computer program code instructions to carry out a method for determining road work extension data for identification of at least work extension. The system may include steps of receiving mobility data associated with the plurality of cells. The mobility data may include one or more of pick-up event data, drop-off event data or point of interest data associated with the plurality of cells. The system may be configured to extract one or more feature vectors from the received mobility data. Such extraction of the one or more feature vectors may be based on aggregation of two or more observations associated with the received mobility data. Further, the system may include clustering the plurality of cells. Such clustering of the plurality of cells may be based on the extracted one or more feature vectors to generate one or more clusters of the plurality of cells.

Embodiments of the disclosure provide a computer program product that includes at least one non-transitory computer-readable storage medium having stored thereon computer-executable program code instructions which when executed by a computer, cause the computer to carry out operations for clustering plurality of cells of a location, the operations comprises the step of obtaining a plurality of lane marking observations map-matched on a roadwork link, where each of the lane marking observations comprises a lane marking location. Further, the operations may include the steps of receiving mobility data associated with the plurality of cells. The mobility data may include one or more of pick-up event data, drop-off event data or point of interest data associated with the plurality of cells and extracting, by one or more processors, one or more feature vectors from the received mobility data. Such extraction of the one or more feature vectors may be based on aggregation of two or more observations associated with the received mobility data. Further, the computer program product may include spatial clustering, by the one or more processors, by clustering of the plurality of cells. Such clustering of the plurality of cells may be based on the extracted one or more feature vectors to generate one or more clusters of the plurality of cells.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "mobility data" may be used to refer to any data related to at least one of pick-up event data, drop-off event data or point of interest (POI) data associated with one or more geographical locations.

The term 'external device' may be used to refer to any device configured to collect and transmit mobility data to a system, for example, the external device may be, but not limited to, a user device, such as a smart phone and a computing device; a vehicle that includes manual vehicle or autonomous vehicle; databases such as third party database and map database.

The term 'cell' may be used to refer to a smallest unit of a geographical location, which is divided into multiple equally measured units.

End of Definitions

Most of the existing demand prediction and optimization solutions rely on map data and cellular data. in order to assess and categorize locations (or cells or sections) with certain demand or supply. However, this kind of solutions may not be granular enough, and therefore may be less accurate. As an attempt to overcome this shortcoming, a method, a system, and a computer program product are provided herein in accordance with at least one example embodiment for spatial clustering based on mobility data.

The embodiments of the system may benefit fleet optimization techniques, both in performance and accuracy, by clustering similar and close cells (various sizes). For example, one of the one or more clusters calculated may correspond to possible idle zones for a driver of a fleet. The method may include a step of receiving mobility data from one or more external devices associated with the plurality of cells. The mobility data may be further processed to extract observations. The processed mobility data may be used to generate one or more feature vectors from the observations. The one or more feature vectors may be normalized and thus one or more clusters from a plurality of cells of the geographical location may be generated. Cluster data associated with the clustering of the plurality of cells may be further used in one or more location based applications.

The system, the method and the computer program product that facilitates spatial clustering of a plurality of cells of one or more geographical locations based on the mobility data is described in FIG. 1 to FIG. 8.

Figure 1:
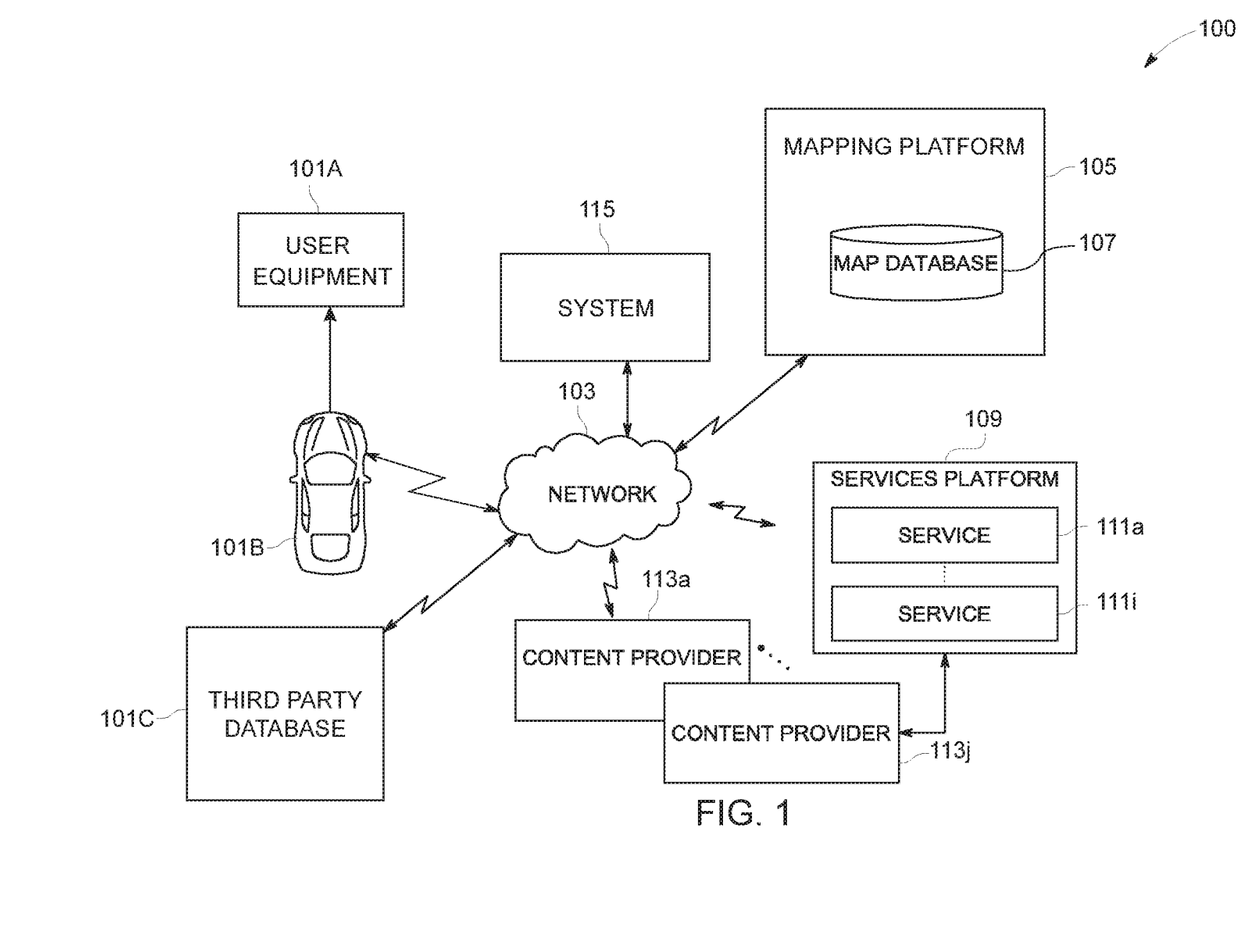
FIG. 1 illustrates a schematic diagram of an environment describing at least one embodiment of the present disclosure.

FIG. 1 illustrates a block diagram of an environment 100 that describes at least one embodiment of the present disclosure.

With reference to FIG. 1, there is shown an environment 100 that may include a User Equipment (UE) 101A (alternatively referred as a user device 101), a vehicle 101B, a third party database 101C, a network 103, a mapping platform 105, a map database 107, a services platform 109 with services 111a to 111i, a plurality of content providers 113a to 113k and a system 115. The services platform 109 may be communicatively coupled to the plurality of content providers 113a to 113k, via the network 103. In accordance with an embodiment, the services platform 109 may be directly coupled to the plurality of content providers 113a to 113k.

All the components in the environment 100 may be coupled directly or indirectly to a network 103. The components described in the network environment 100 may be further broken down into more than one component and/or combined together in any suitable arrangement. Further, one or more components may be rearranged, changed, added, and/or removed.

The User Equipment (UE) 101A may be in communication with the mapping platform 105 over the network 103. The network 103 may be wired, wireless, or any combination of wired and wireless communication networks, such as cellular, Wi-Fi, internet, local area networks, communication protocols or the like. In an exemplary embodiment, the user device 101 is a navigation system that is configured to provide route guidance and navigation related functions to a user associated with the vehicle 102. Also, in an alternate embodiment, the user device 101 may be configured with an application that is defined to collect mobility data through one or more applications. In an exemplary embodiment, the user device 101A is configured with a taxi service booking application. The taxi booking service of the user device 101A may be further configured to collect pick-up and drop off event data of one or more locations by consuming various map services provided by the mapping platform 105. Further, the user device 101A, in association with the mapping platform 105, may be configured to collect point of interest (POI) data, such as, but not limited to, event data, public event data, public transportation scheduled data, traffic data, parking event data or trajectory data. In an exemplary embodiment, the pick-up event data, drop-off event data and the point of interest (POI) data together is referred as the mobility data.

Alternatively, or additionally, the environment 100 may further comprise the vehicle 101B in communication with the mapping platform 105 over the network 103, where the vehicle 101B, in association with the mapping platform 105, may be configured to collect the mobility data. In one example, the vehicle 101B may be an autonomous, a semi-autonomous, or a manually driven vehicle. An autonomous vehicle, as used throughout this disclosure, may refer to a vehicle having autonomous or semi-autonomous driving capabilities at least in some conditions. In one embodiment, the user equipment 101A may be installed in the vehicle 101B and adapted to capture the mobility data associated with the location. The mobility data may further be received from an external database, such as, the third party database 101C. In one example, one or more of the user device 101A, the vehicle 101B or the third party database 101C may be referred to as external device(s). In some example embodiments, one or more of the mapping platform 105, the user device 101A, the vehicle 101B, or the third party database 101C may be owned and operated by a common entity, such as, a navigation service provider or a vehicle manufacturer and the like. In one example, the mobility data may comprise location data and time stamp associated with the pick-up event data, drop-off event data and the point of interest (POI) data. In one embodiment, the user equipment 101 may transmit the captured mobility data to an Original Equipment Manufacturer (OEM) cloud sequentially. Alternate to the previous embodiment, the road sign observations may be scheduled to be transmitted to the OEM cloud in batches.

Further, the user equipment 101A may be a mobile computing device that includes, but not limited to, a laptop computer, a tablet computer, a mobile phone, a smart phone, a navigation unit, a personal data assistant, a watch and a camera. Additionally or alternatively, the user equipment 101A may be a fixed computing device, such as a personal computer, a computer workstation, a kiosk, an office terminal computer or a system. The user equipment 101A may be configured to access the mapping platform 105, such that the user equipment 101A may provide navigational assistance to the user among other services provided through access to the mapping platform 105.

As exemplarily illustrated, the mapping platform 105 may also include the map database 107 that stores node data, road segment data or link data, the point of interest (POI) data, posted signs related data or the like. The map database 107 may also include cartographic data, routing data, and maneuvering data. According to some example embodiments, the road segment data may be links or segments representing roads, streets, or paths, as may be used in calculating a route or recorded route information for determination of one or more personalized routes. The node data may be end points corresponding to the respective links or road segments of road segment data. The road link data and the node data may represent a road network, used by vehicles (such as the vehicle 101B. The vehicle 101b may correspond to, but not limited to, cars, trucks, buses, and motorcycles. Optionally, the map database 107 may include path segment, node data records and other data that may represent, for example, pedestrian paths or areas in addition to or instead of the vehicle 101B road record data. The road segments and nodes may be associated with attributes, such as, geographic coordinates, street names, address ranges, speed limits, turn restrictions at intersections, POIs and other navigation related attributes. The POIs may correspond to, but not limited to, fueling stations, hotels, restaurants, museums, stadiums, offices, auto repair shops, buildings, stores and parks. The map database 107 may include data associated with the POIs and respective locations in the POI records. The map database 107 may additionally include pick-up and drop-off event data of a location. The location may correspond to cities, towns, or other point of interest (POI) data. The other POI data may include, but not limited to, public event data, public transportation scheduled data, traffic data, parking event data or trajectory data, and feature data associated with other geographic features, such as, bodies of water and mountain ranges. The location or the feature data may be part of the POI records (such as, a data point used for displaying or representing a site of a city). In addition, the map database 107 may include event data, such as, traffic incidents, construction activities, scheduled events and unscheduled events associated with the POI data records or other records of the map database 107 associated with the mapping platform 105. The map database 107 may additionally include data related to road work, which may alternatively be referred as road work zones, such as, location of the road work zone, diversions to be caused due to the roadwork zones and suggested routes to avoid congestion to be caused due to the roadwork zones. The system 115 may receive the data related to road work zones from external systems, such as, road work planning system of the municipalities.

The mapping platform 105 may be supported by a content provider, such as, a map developer. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle 102 along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform the map database 107 of features within a location that are appropriate for mapping. For example, motion sensors, inertia sensors, image capture sensors, proximity sensors, LIDAR (light detection and ranging) sensors and ultrasonic sensors may be used to collect sensor data. The collection of large quantities of crowd-sourced data may facilitate accurate modeling and mapping of the location, whether a road segment or an interior of a multi-level parking structure. Also, remote sensing, such as, aerial or satellite photography may be used to generate map geometries directly or through machine learning as described herein.

The map database 107 of the mapping platform 105 may be a master map database stored in a format that facilitates update, maintenance, and development of the map data. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and delivery formats may be compiled or further compiled to form geographic database products or databases, which may be used in end user navigation devices or systems. In some embodiments, the map database 107 may be a master geographic database configured at a server side. In alternate embodiments, a client side map database 107 may represent a compiled navigation database that may be used in or with end user devices (e.g., the User Equipment 101A) to provide navigation, speed adjustment and map-related functions to navigate through roadwork zones.

In one embodiment, the user device or the User Equipment 101A may be an in-vehicle navigation system, such as, an infotainment system, a personal navigation device (PND), a portable navigation device, a cellular telephone, a smart phone, a personal digital assistant (PDA), a watch, a camera, a computer, a workstation, and other device that may perform navigation-based functions, such as, digital routing and map display. The user may use the User Equipment 101 for navigation and map functions, such as, guidance and map display. The User Equipment 101 may be configured to determine one or more personalized routes or route segments. Such determination may be based on one or more calculated and recorded routes, according to some example embodiments.

As discussed, the environment 100 may further include the service platform 109, which may be used to provide navigation related functions and services 111a to 111i to an application running on the UE 101. The services 111a-111i may include, but not limited to, navigation functions, speed adjustment functions, traffic related updates, weather related updates, warnings and alerts, parking related services and indoor mapping services. The services 111a to 111i may be provided by the plurality of content providers 113a-113k. In some examples, the content provider 113a-113k accesses various Software development Kits (SDKs) from the services platform 109 for implementation of the one or more services. In an exemplary embodiment, the services platform 109 and the mapping platform 105 are integrated into a single platform to provide a suite of mapping and navigation related applications for Original Equipment Manufacturer (OEM) devices, such as, the user equipment 101. In accordance with an embodiment, the user equipment 101 may be configured to interface with the services platform 109, the content provider's services 113a-113k, and the mapping platform 105 via the network 103. Thus, the mapping platform 105 and the services platform 109 may be configured to provide cloud-based services on the UE 101. The cloud-based services may correspond to, but not limited to, storage of lane marking observations in the OEM cloud in batches, in real-time or near real time.

Further, the external devices, such as, the user device 101A, the vehicle 101B and the third party database 101C may be communicatively coupled with the system 115 via the network 103. In accordance with an embodiment, the system 115 may be configured to cluster the plurality cells associated with the location via the network 103.

Figure 2:
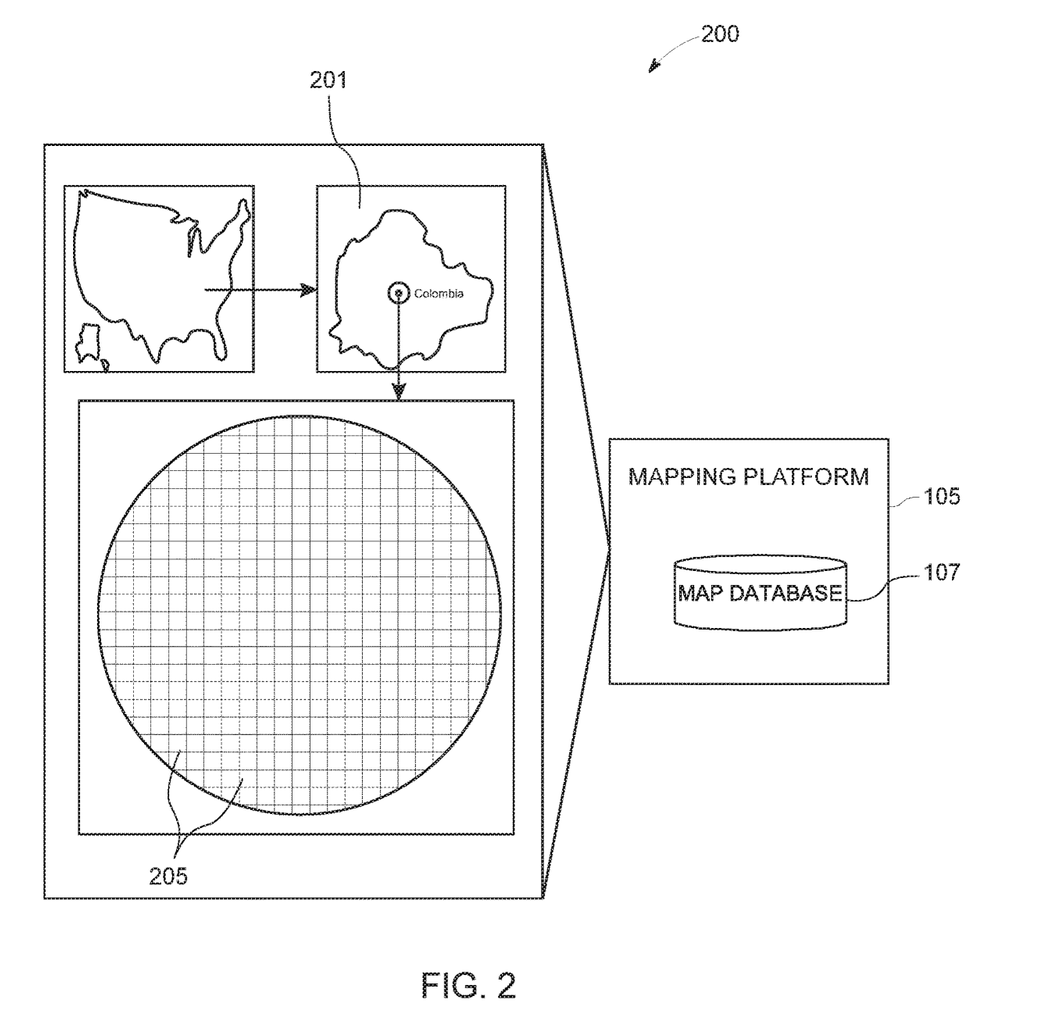
FIG. 2 illustrates a schematic representation of an exemplary environment for generation a plurality of cells of at least one geographical location, in accordance with an example embodiment.

FIG. 2 illustrates a schematic representation of an exemplary environment 200 for generation of cells of a geographical location 201, in accordance with an exemplary embodiment. FIG. 2 is explained in conjunction with elements from FIG. 1. With reference to FIG. 2, there is shown the mapping platform 105 and the map database 107. There is further shown the geographical location 201 (alternatively referred to as the location 201) and a plurality of cells 205. The mapping platform 105 may be directly coupled to the map database 107.

In accordance with an embodiment, the mapping platform 105 may be communicatively coupled to the map database 107, via the network 103. The mapping platform 105 may be defined with a processing unit (not shown in FIG. 2). The processing unit may be further configured to generate the plurality of cells 205 of the geographical location 201. In one example, generation of the plurality of cells 205 of the location 201 includes a step of dividing the location 201 into multiple equally measured units. A map includes map projections. In one example, the processing unit transforms spatial attributes of a location (such as the location 201) from a sphere or an ellipsoid into a plane. The spatial attributes may include latitude and longitude of the location.

According to one aspect of the mapping platform 105, the processing unit may be configured to adapt cylindrical map projections. The cylindrical map projections may correspond to, mapping of meridians to vertical lines that may be visualized by imagining a cylinder whose axis coincides with the Earth's axis of rotation. The cylinder may be wrapped around the Earth, projected onto, and then unrolled. The cylindrical projections may stretch along a distance (for example, east-west), by their geometry of construction. The amount of stretch may be same at any chosen latitude on all the cylindrical map projections and is given by the secant of the latitude as a multiple of the equator's scale. In one example, the Mercator projection, which is a kind of cylindrical projection, may be used in the mapping platform 105 to generate the plurality of cells 205. The map projection of Mercator may include an ability to represent lines of constant course, known as rhumb lines or loxodromes, as straight segments that conserve the angles with the meridians. Although, the linear scale may be equal in all directions around any point, thus preserving the angles and the shapes of small objects (which makes the projection conformal), the Mercator projection may distort size of the objects as the latitude increases from the Equator to the poles, where the scale becomes infinite. Once the location 201 is divided into the plurality of cells 205, the data of the plurality of cells 205 may be stored in the map database 107 in the form of spatial data and is accessible to a system such as the system 115 of FIG. 1 over the network 103.

The system 115 may be configured to accesses the spatial data of the location and cluster the cells from the plurality of the cells 205, based on the one or more common attributes. A system describing the process of clustering of cells is described in FIG. 3.

Figure 3:
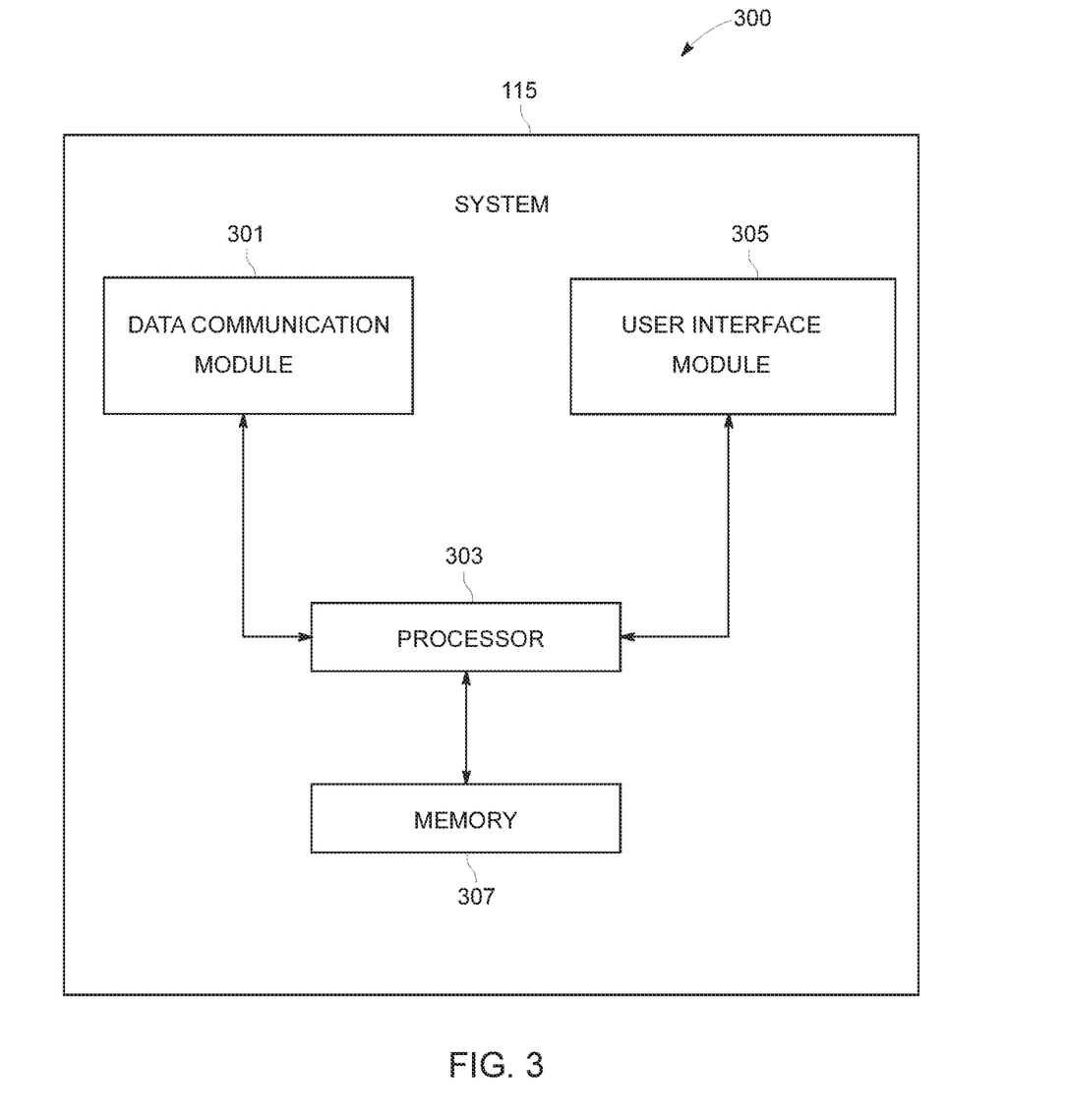
FIG. 3 illustrates a block diagram of a system for determining clustering a plurality of cells of at least one geographical location of FIG. 2, in accordance with an example embodiment.

FIG. 3 illustrates a block diagram 300 of the system 115 to determine clustering of the plurality of cells (such as the plurality of cells 205 of FIG. 2) of the geographical location (such as the geographical location 201 of the FIG. 2), in accordance with an example embodiment. The system 115 may include a data communication module 301, one or more processors, such as a processor 303, a user interface module 305, a memory 307. The system 115 may include additional modules, fewer modules, or any other suitable combination of modules that perform any suitable operation or combination of operations. The memory 307 may be configured to store computer program code instructions and the at least one processor 303 (or the processor 303) configured to execute the computer program code instructions stored in the memory 307.

In one embodiment, the data communication module 301 communicates with the external device(s) disclosed in the detailed description of FIG. 1 and may receive the mobility data corresponding to the plurality of cells 205 of the location 201. In an alternative embodiment, the data communication module 301 may receive mobility data from the OEM cloud and/or the mapping platform 105 over the network 103 as described in FIG. 1. In some example embodiments, the data communication module 301 receives pick-up event data, drop-off event data and the point of interest (POI) data from one or more user devices, such as the user device 101A, the vehicle 101B and the third party database 101C as described in FIG. 1 via the network 103. The mobility data may include location co-ordinates, time stamp and the like of pick-up event data, drop-off event data and point of interest (POI) data. In one embodiment, the data communication module 301 receives mobility data configured to describe a demand and supply data along with the fleet data.

In some embodiments, the processor 303 may be configured to provide Internet-of-Things (IoT) related capabilities to users of the system 115 disclosed herein. The IoT related capabilities may in turn be used to provide smart city solutions by providing real time parking updates, big data analysis, and sensor based data collection by using the cloud based mapping platform 105 of FIG. 1 for providing navigation and parking recommendation services, demand prediction services for ride fleet management. In some embodiments, the mapping platform 105 is configured to provide an environment for development of navigation recommendation and parking strategy recommendation solutions for navigation systems in accordance with the embodiments disclosed herein. The environment may be accessed using the user interface module 305 of the system 115 disclosed herein. The user interface module 305 may provide an interface for accessing various features and data stored in the system 115.

The processor 303 may be further configured to extract one or more feature vectors from the mobility data. In one embodiment, the extraction of one or more feature vectors is carried out based on the aggregation of two or more of observations associated with the mobility data. In one example, the extraction of the one or more feature vector includes the step extracting a plurality of numeric attributes from the aggregated two or more observations, wherein the plurality of numeric attributes include numerical data associated with data of one or more of total number of events occurred, mean value of the count or the occurred events, maximum count and frequency of occurrence of the events associated with the mobility data related to the plurality of cells 205. For example, the main features used for clustering are the counts in (taxi drop-off) and out (taxi pickups) from each cell. The behavioral feature vector comprises of 24 features per cell where, 12 features of "in" counts—the average amount of drop offs in the cell for each two hours of the day (for example: average count of drop offs between 14:00-16:00) and 12 features of "out" features—the average number of pickups in the cell for every two hours. Further, different sets of 24 feature vectors may be extracted for weekdays and weekends. Further, the processor 303 may be configured to represent each of the plurality of numeric attributes into the at least one feature vector. In one example, the feature vector may be defined as a vector that contains information describing an object's important characteristics.

Furthermore, based on a normalization method known in the art or invented in the future, the processor 303 may be configured to normalize each of the one or more feature vectors. In one example, the normalization may be defined as the process of converting a vector into a "standard" vector. To normalize a vector, therefore, is to take a vector of any length and, keeping it pointing in the same direction to change its length to 1 and turning it into a unit vector. In another example, the normalization may be carried out using on one or more of length normalization, where the direction of the vector is retained but the ratio between features in a vector might have different weight and distribution; and mean and standard normalization, where each feature is provided with the same weight and $(N\sim(0,1))$ distribution and the relative vector size is retained, for example, cell with many counts will be larger than one with less counts; Additionally or optionally, the normalization may be carried out through category normalization methods, where the counts are grouped into categories, for example, counts between (0-5) is one group, (6-10) is another group and so on.

After normalization of the one or more feature vectors, the processor 303 may be configured to cluster the plurality of cells 205, based on the normalized feature vectors. In one example, several clustering methods are followed to cluster the plurality of cells 205. One of the several clustering methods may include a count clustering method. In count clustering method, the plurality of cells 205 are clustered as one or more of low value, medium value, or high value cells based on a threshold value of sum of counts of the feature vectors, i.e., sum of in-out count represents each cell of the plurality of cells 205, based on which a histogram may be created. Further, the processor 303 may empirically determine a threshold to classify the plurality of cells 205 to one of three classes, low, medium and high counts. In another example, the processor 303 may cluster the plurality of cells 205 based on behaviour of the plurality of cells 2015 (behavioural clustering). An example of the behavioural clustering may include k-means clustering technique. The K-means clustering technique may be defined as partition of feature vectors associated with a plurality of observations into k clusters in which each feature vector belongs to the cluster with the nearest mean, serving as a prototype of the cluster. For example, feature vectors of 24 in-out features representing each cell may be used in a k-means clustering technique. Each of the three total count clusters may be clustered into smaller clusters, which typically results in 4-8 sub clusters. Additionally or optionally, the processor 303 may carry out clustering of the plurality of cells 205 based on geographical clustering. An example of geographical clustering may include density based spatial clustering algorithm (DBSCAN). The DBSCAN may be defined as grouping the feature vectors that are closely packed together, (points with many nearby neighbors), marking as outliers points that lie alone in low-density regions (points whose nearest neighbors are too far away). In one embodiment, each cell of the plurality of cells 205 is labeled as a member of a cluster or a set of hierarchical groups and subgroups.

The processor 303 may be embodied in a number of different ways. For example, the processor 303 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 303 may include one or more processing cores configured to perform independently. A multi-core processor may enable multiprocessing within a single physical package. Additionally or alternatively, the processor 303 may include one or more processors configured in tandem via the bus to enable independent execution of instructions, pipelining and/or multithreading.

Additionally or alternatively, the processor 303 may include one or processors capable of processing large volumes of workloads and operations to provide support for big data analysis. In an example embodiment, the processor 303 is in communication with the memory 307 via a bus for passing information among components of the system 115. The memory 307 may be non-transitory and may include, such as, one or more volatile and/or non-volatile memories. In other words, for example, the memory 307 may be an electronic storage device (for example, a computer readable storage medium) that comprises gates configured to store data (for example, bits). The data may be retrievable by a machine (for example, a computing device like the processor 303). The memory 307 may be configured to store information, data, content, applications, instructions, or the like, for enabling the apparatus to carry out various functions in accordance with an example embodiment of the present invention. For example, the memory 307 is configured to buffer input data for processing by the processor 303. As exemplarily illustrated in FIG. 3, the memory 307 could be configured to store instructions for execution by the processor 303. As such, whether configured by hardware or software methods, or by a combination thereof, the processor 303 may represent an entity (for example, physically embodied in circuitry) capable of performing operations according to an embodiment of the present invention while configured accordingly. Thus, for example, when the processor 303 is embodied as an ASIC, FPGA or the like, the processor 303 may be specifically configured hardware for conducting the operations described herein. Alternatively, as another example, when the processor 303 is embodied as an executor of software instructions, the instructions may specifically configure the processor 303 to perform the algorithms and/or operations described herein when the instructions are executed. However, in some cases, the processor 303 may be a processor specific device (for example, a mobile terminal or a fixed computing device) configured to employ an embodiment of the present invention by further configuration of the processor 303 by instructions for performing the algorithms and/or operations described herein. The processor 303 may include, among other things, a clock, an arithmetic logic unit (ALU) and logic gates configured to support operation of the processor 303.

In some embodiments, the processor 303 may be configured to provide Internet-of-Things (IoT) related capabilities to users of the system 115 disclosed herein. The IoT related capabilities may in turn be used to provide smart city solutions by providing real time parking updates, big data analysis, and sensor based data collection by using the cloud based road work identification system 105 for providing navigation and parking recommendation services and demand prediction services. The user interface module 305 may be configured to provide an interface for accessing various features and the data stored in the system 115.

Figure 4:
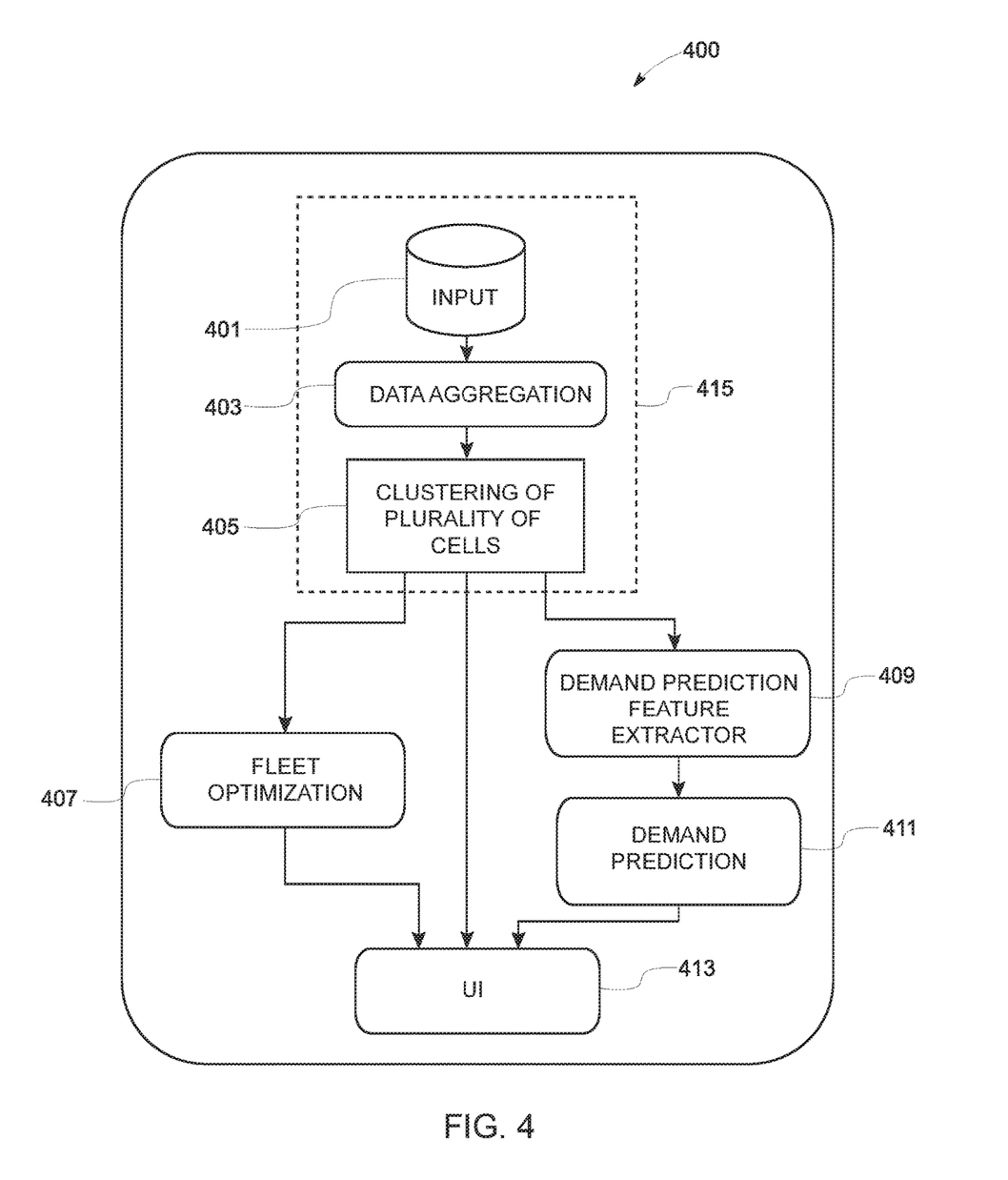
FIG. 4 shows a block diagram representing the process of utilizing spatial clustering data in multiple location based applications, in accordance with one embodiment.

FIG. 4 shows a block diagram representing a method 400 to utilize spatial clustering data in one or more location based applications, in accordance with one embodiment of the invention. It will be understood that each block of a flow diagram may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 307 of the system 115 of FIG. 3, employing an embodiment of the present invention and executed by a processor 303 of the system 115. As will be appreciated, any such computer program instructions may be loaded onto a computer or other programmable apparatus (for example, hardware) to produce a machine, such that the resulting computer or other programmable apparatus implements the functions specified in the flow diagram blocks. The computer program instructions may also be stored in a computer-readable memory 307 that may direct a computer or other programmable apparatus to function in a particular manner, such that the instructions stored in the computer-readable memory 307 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

Accordingly, the method 400 to utilize clustering data in one or more location based applications is represented in the block diagram. The method 400 includes an affiliated method 415 that represents a step of clustering of the plurality of cells 205 of a location (such as, the location 201 of FIG. 2). In one example, the affiliated method 415 is executed through a system such as the system 115 of FIG. 3. The affiliated method 415, at 401, may include reception of input data, which may be mobility data associated with the plurality of cells 205. In one example, the mobility data may be received from one or more external devices as described in FIG. 1. One or more processors (e.g. the processor 303) may process the input data received at step 401, and may carry out data aggregation, at 403. In one example, the processor 303 performs the data aggregation by extracting observations from the received input and aggregating the extracted observations to receive feature vectors from the input. Additionally, to extract one or more feature vectors, the method 400 may include the step of normalization of each of the one or more feature vectors based on one or more of length normalization, mean and standard normalization, or category normalization. At 405, the method 400 may include clustering of the plurality of cells 205 of the location 201, based on the generated normalized feature vectors. In one example, the clusters of the plurality of cells 205 further includes a cluster for unsupervised or un-labeled group of cells with similar behavior and/or location and/or any other observation property. Further, in one example, the clusters of plurality of cells 205 of the location 201 may be represented on a user interface at 413.

Further, the generated clusters of the plurality of cells 205 may be used for one or more location based applications. In an example, at 407, the cluster data generated at 405 may be utilized for fleet optimization. Fleet optimization may be defined as an administrative approach that allows companies to organize and coordinate work vehicles with the aim to improve efficiency, reduce costs, and provide compliance with government regulations. In specific terms, the fleet optimization may be commonly used for vehicle tracking. According to one aspect of the invention, utilization of the cluster data that reveals grouping of similar cells of plurality cells, enables the fleet optimization algorithms or techniques to increase performance and accuracy. For example, the cluster data may reveal cells that are idle zones for drivers in a location.

In one example, the cluster data may be used by multiple administration platforms associated with the fleet optimization. For example, the administration platforms, which may be alternatively referred to as third party servers, may be associated with at least one of courier service, oil and gas delivery services, utilities, repair service and service industry businesses. The third party servers may be configured to ensure responsible vehicle use, confirm safety and enable real-time tracking.

In one embodiment, according to FIG. 4, the method 400 further includes, at 409 and 411, the step of utilization of the cluster data in demand prediction. The method 400, at step 409, may include demand prediction features may be extracted from the cluster data, in order to determine distance of each of a plurality of clusters from a center of the plurality of clusters. The step of determining demand prediction 411 may include determination of the distance of each of the plurality of clusters from the center of the plurality of clusters. Additionally, the predicted demand in clustered cells is defined to correlate with each other. At 413, a user interface may be represented which is curated with fleet optimization and demand prediction data. In one embodiment, the fleet optimization (at 407) and the demand prediction data may be represented through clusters that may appear as an additional map layer on the user interface of any user device. In the present context, the user device may be any of, but not limited to, administrative platforms, mapping platform (such as the mapping platform 105), user equipment (such as the user equipment 101A) and the like. In one example, the user interface curated with the clusters as an additional map layer may be used in location based service applications such as taxi services. The user interface representing fleet optimization and demand prediction as a map layer is described in FIG. 5 and FIG. 6 respectively.

Figure 5:
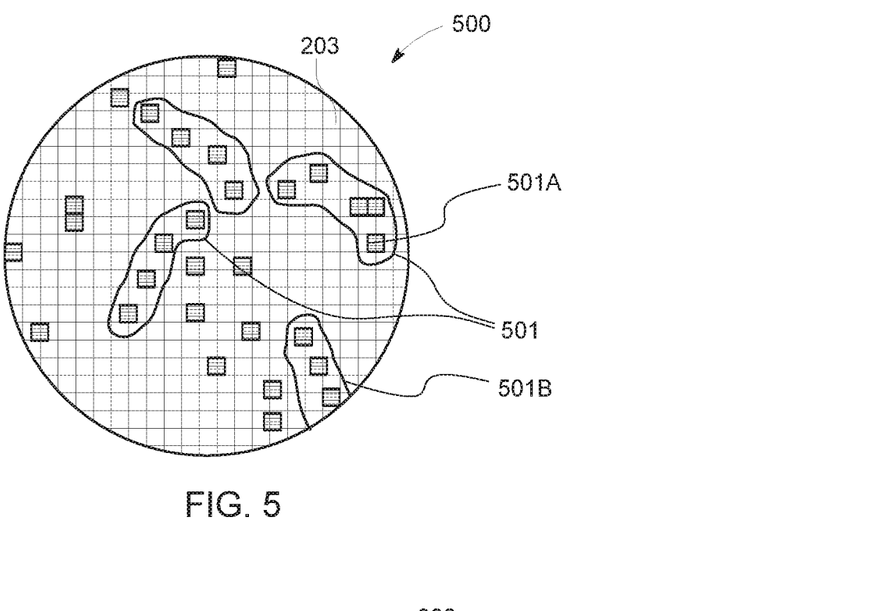
FIG. 5 illustrates a graphical representation indicating extraction of spatial clustering data to build fleet management application, in accordance with an example embodiment.

FIG. 5 illustrates a schematic diagram 500 of a user interface 203 to represent graphical representation for fleet optimization/fleet management based on the extracted spatial clustering data, in accordance with an example embodiment of the invention. The diagram 500 of the user interface 203 indicates an additional map layer that shows a plurality of cluster cells 501 of a geographical location, such as the geographical location 201 of FIG. 2. The diagram 500 of the user interface 203 represents multiple clusters of cells 501, where each cluster 201 is defined with cells which are similar in attributes. In one example, a set of active cells, where maximum number of pick up are recorded, may be termed as an active cluster 501A and a set cells representing idle behavior may be termed as a passive cluster 501B.

Figure 6:
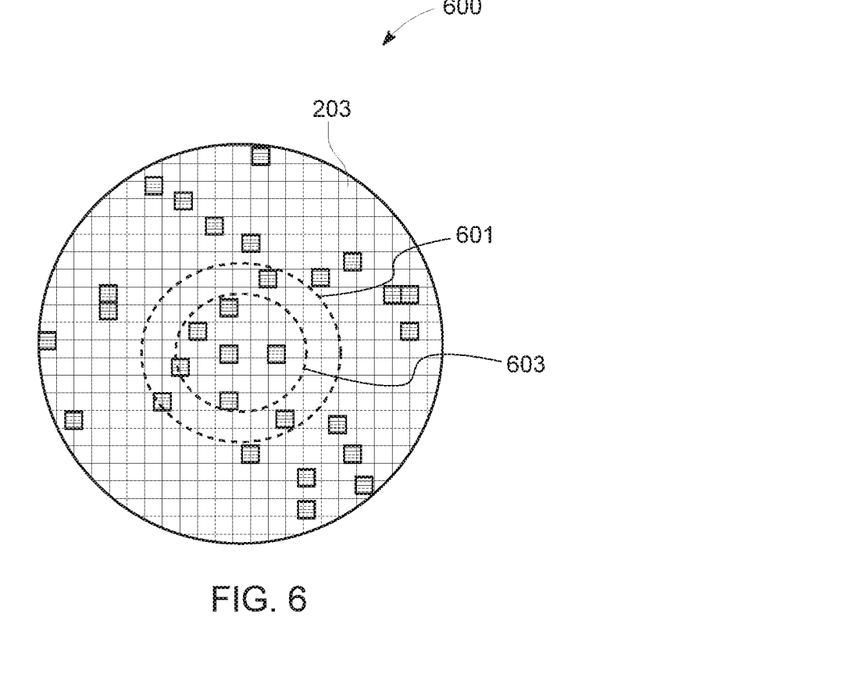
FIG. 6 illustrates a graphical representation indicating extraction of spatial clustering data to build demand prediction application, in accordance with an example embodiment.

FIG. 6 illustrates a schematic diagram 600 of a user interface 203 that shows graphical representation for demand prediction using extracted spatial clustering data, in accordance with an example embodiment of the invention. The user interface 203 illustrated in the schematic diagram 600 may represent different instances showing the distance of sub-ordinate cells from a cluster center (601, 603). In an example, a distance between the distance of sub-ordinate cells from a cluster center (601, 603) may be used as features for the demand prediction. In one example, the cells in the inner circle 603 close to the cluster center may be estimated as the demand area and the cells in the outer circle 601 away from the cluster center is estimated as less demand area.

Figure 7:
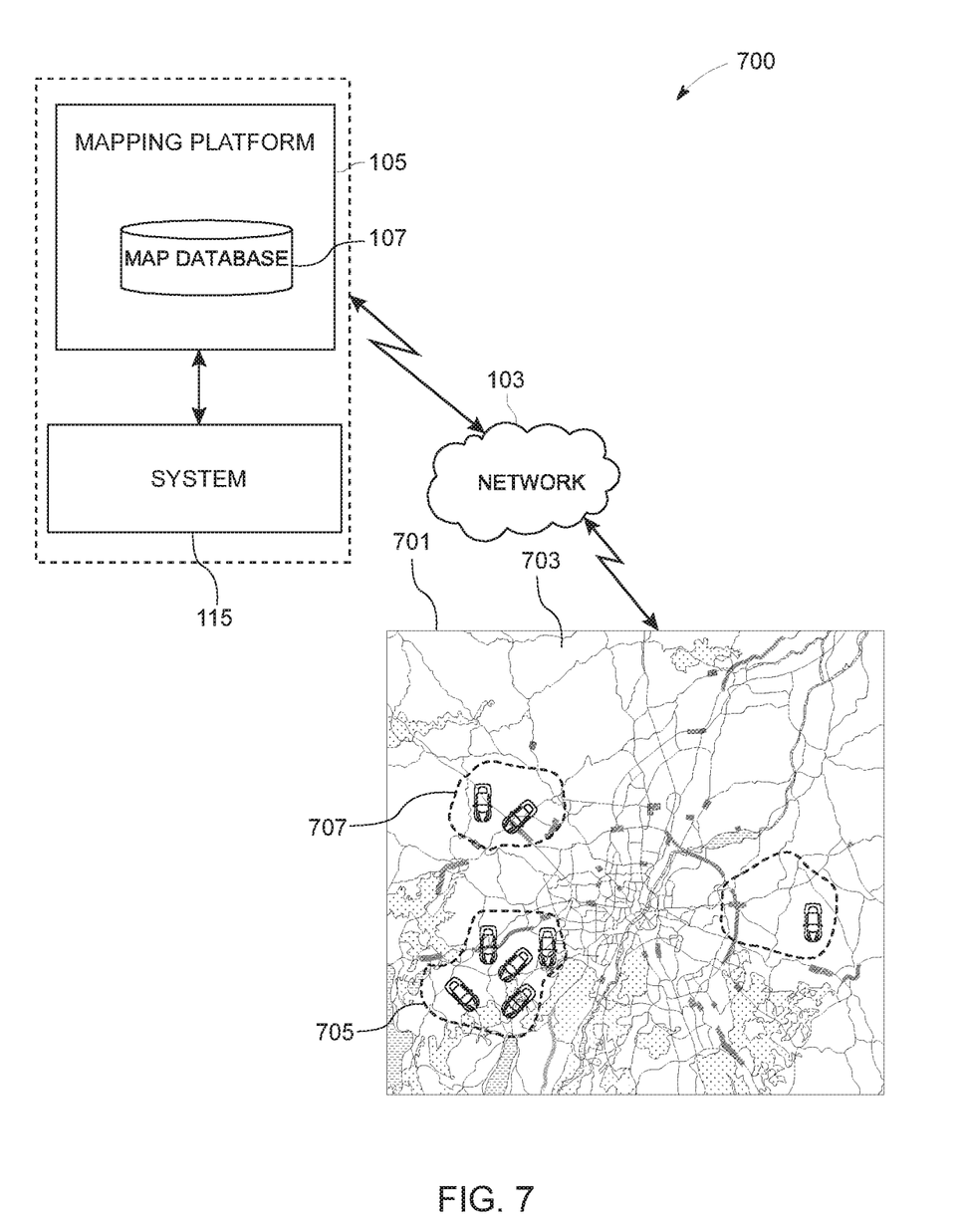
FIG. 7 illustrates a schematic representation of a user interface communicatively coupled to a system of FIG. 1, in accordance with an example embodiment.

FIG. 7 illustrates a schematic representation 700 of a user interface 701 on a user equipment (such as the User Equipment 101A), communicatively coupled to the system 115, configured to cluster plurality of cells of a location, in association with the mapping platform 105 containing map database 107, in accordance with an example embodiment. Accordingly, in one example, the user interface 701 shows a graphical representation of a location 703 hosted by a location based application, such as taxi service, that utilize data of fleet optimization and demand prediction. In one example, the location based application may be supported by the system 115, or any similar systems configured with a processor, in association with a mapping platform 105.

Further, the cluster data may be streamed from the system 115 in association with the mapping platform 105 through the network 103. As per the cluster data, the system 115 may be configured to introduce the availability of more number of taxis in a location of high demand 705 and less number of taxis in a location of low demand 707 to meet requirements of cab users by resolving demand and supply necessity. In some example embodiments, the processor 303 (of FIG. 3) may be configured to provide a method for clustering of plurality of cells will be discussed in conjunction with FIG. 8 as below.

Figure 8:
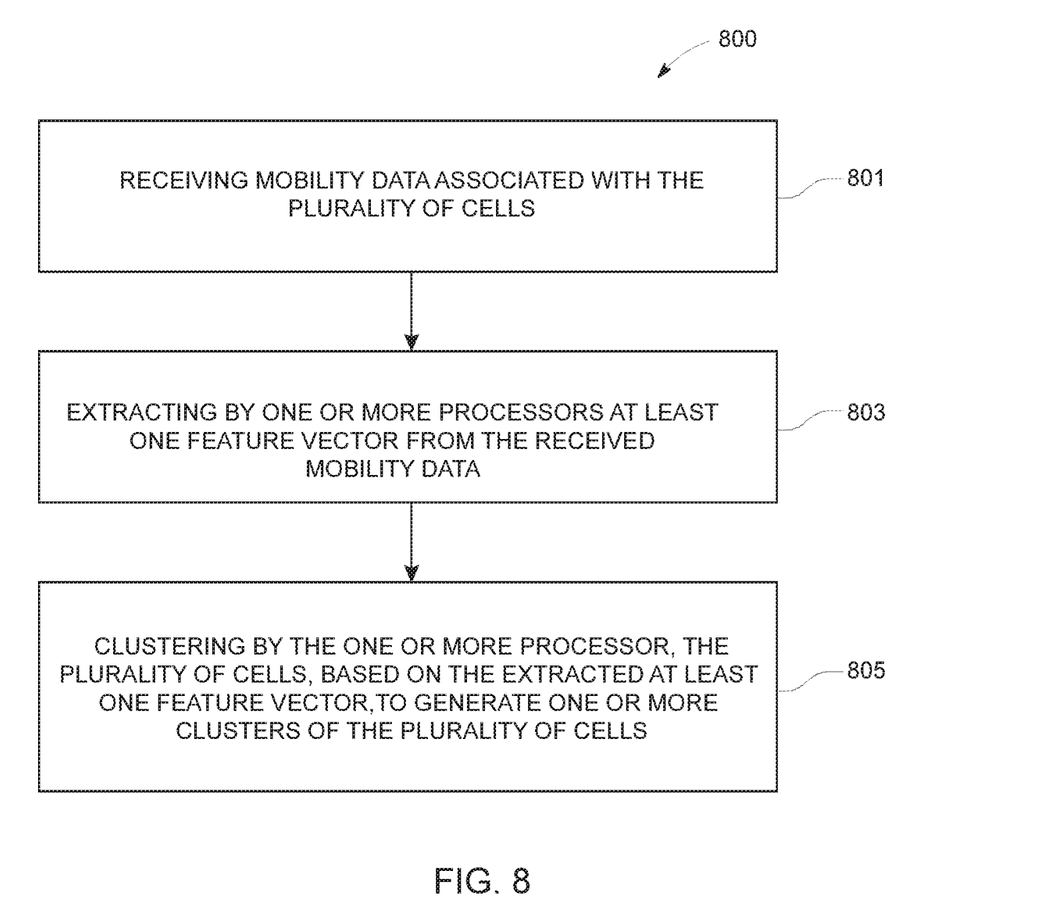
FIG. 8 illustrates a flow diagram of a method for determining clustering a plurality of cells of at least one geographical location of FIG. 2, in accordance with an example embodiment.

Accordingly, FIG. 8 illustrates a flow diagram of a method 800 for clustering plurality of cells of a location, in accordance with an example embodiment of the present invention. It will be understood that each block of the flow diagram of the method 800 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 307 of the system 115 of FIG. 3, employing an embodiment of the present invention and executed by a processor 303 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 307 that may direct a computer or other programmable apparatus to function in a particular manner, such that the instructions stored in the computer-readable memory 307 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 800, at 801, includes a step of receiving mobility data associated with the plurality of cells, wherein the mobility data includes one or more of pick-up event data, drop-off event data or point of interest (POI) data associated with the plurality of cells.

At 803, the method 800 includes steps of extracting by one or more processors, at least one feature vector from the received mobility data, based on aggregation of two or more observations associated with the received mobility data and, at 805, clustering by the one or more processors, the plurality of cells, based on the extracted at least one feature vector, to generate one or more clusters of the plurality of cells.

In an example embodiment, a system for performing the method of FIG. 8 above may comprise a processor (e.g. the processor 303) configured to perform some or each of the operations (801-805) described above. The processor may, for example, be configured to perform the operations (801-805) by performing hardware implemented logical functions, executing stored instructions, or executing algorithms for performing each of the operations. Alternatively, the system may comprise means for performing each of the operations described above. In this regard, according to an example embodiment, examples of means for performing operations 801-805 may comprise, for example, the processor 303 and/or a device or circuit for executing instructions or executing an algorithm for processing information as described above.

Embodiments of the present disclosure described herein and those that are evident from the disclosure, provide for accurate prediction of mobility demand. Thus, a fleet owner may utilize the present invention to efficiently manage ride services so that vehicles of the fleet do not run empty. Also, a user using the ride services may be provided with, for example, a graphical representation of the predicted mobility demand. Thus, the user may better decide when and where to book a ride service. In this way, embodiments of the present disclosure provide for efficient demand prediction and fleet management and thus reflect improvements in the field of navigation technology.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for clustering a plurality of cells of at least one geographical location, comprising:
receiving mobility data associated with the plurality of cells over a network, wherein the mobility data includes one or more of pick-up event data, drop-off event data or point of interest data associated with the plurality of cells;
extracting by one or more processors, at least one feature vector from the received mobility data, based on aggregation of two or more observations associated with the received mobility data;
clustering by the one or more processors, the plurality of cells, based on the extracted at least one feature vector, to generate one or more clusters of the plurality of cells;
classifying the one or more clusters as an active cluster or a passive cluster based on the mobility data of the one or more clusters;
determining a demand prediction for at least one cluster of the one or more clusters based on a distance between a sub-ordinate cell of the at least one cluster and a cluster center of the at least one cluster; and
displaying the demand predication for the at least one cluster as a map layer on a user interface of a user device, wherein the map layer comprises a graphical representation of the distance between the sub-ordinate cell of the at least one cluster and the cluster center of the at least one cluster,
wherein the plurality of cells of the at least one geographical location comprises a plurality of equally measured units.

2. The method of claim 1, further comprising receiving the mobility data from one or more user devices, vehicles, or external databases.

3. The method of claim 1, wherein the point of interest data includes one or more of private event data, public event data, public transportation scheduled data, traffic data, parking event data or trajectory data.

4. The method of claim 1 further comprising, normalizing each of the at least one feature vector based on one or more of length normalization, mean and standard normalization, or category normalization.

5. The method of claim 1, further comprising clustering the plurality of cells based on a count clustering method, wherein the plurality of cells are clustered as one or more of low value, medium value, or high value cells based on a threshold value of sum of counts of the at least one feature vector.

6. The method of claim 1, further comprising clustering the plurality of cells of the at least one geographical region based on a k-means clustering algorithm.

7. The method of claim 1, further comprising clustering the plurality of cells of the at least one geographical region based on a density based special clustering algorithm.

8. A system for clustering a plurality of cells of at least one geographical location, comprising:
at least one memory configured to store computer program code instructions; and
at least one processor configured to execute the computer program code instructions to:
receive mobility data associated with the plurality of cells over a network, wherein the mobility data includes one or more of pick-up event data, drop-off event data or point of interest data associated with the plurality of cells;
extract at least one feature vector from the received mobility data, based on aggregation of two or more observations associated with the received mobility data;
cluster the plurality of cells, based on the extracted at least one feature vector, to generate one or more clusters of the plurality of cells;
classify the one or more clusters as an active cluster or a passive cluster based on the mobility data of the one or more clusters;
determine a demand prediction for at least one cluster of the one or more clusters based on a distance between a sub-ordinate cell of the at least one cluster and a cluster center of the at least one cluster; and
display the demand predication for the at least one cluster as a map layer on a user interface of a user device, wherein the map layer comprises a graphical representation of the distance between the sub-ordinate cell of the at least one cluster and the cluster center of the at least one cluster,
wherein the plurality of cells of the at least one geographical location comprises a plurality of equally measured units.

9. The system of claim 8, wherein the at least one processor is further configured to receive the mobility data from one or more of user devices, vehicles, or external databases.

10. The system of claim 8, wherein the point of interest data includes one or more of private event data, public event data, public transportation scheduled data, traffic data, parking event data or trajectory data.

11. The system of claim 8, wherein the at least one processor is further configured to:
extract a plurality of numeric attributes from the aggregated two or more observations, wherein the plurality of numeric attributes include numerical data associated with one or more of counts, mean, max or frequency associated with the mobility data; and
represent each of the plurality of numeric attributes into the at least one feature vector.

12. The system of claim 8, wherein the at least one processor is further configured to normalize each of the at least one feature vector based on one or more of length normalization, mean and standard normalization, or category normalization.

13. The system of claim 8, wherein the at least one processor is further configured to cluster the plurality of cells based on a count clustering method, wherein the plurality of cells are clustered as one or more of low value, medium value, or high value cells based on a threshold value of sum of counts of the at least one feature vector.

14. The system of claim 8, wherein the at least one processor is further configured to cluster the plurality of cells of the at least one geographical region based on a k-means clustering algorithm.

15. The system of claim 8, wherein the at least one processor is further configured to cluster the plurality of cells of the at least one geographical region based on a density based special clustering algorithm.

16. A computer program product comprising at least one non-transitory computer-readable storage medium having stored thereon computer-executable program code instructions which when executed by a computer, cause the computer to carry out operations for clustering a plurality of cells of at least one geographical location, the operations comprising:
receiving mobility data associated with the plurality of cells over a network, wherein the mobility data includes one or more of pick-up event data, drop-off event data or point of interest data associated with the plurality of cells;
extracting at least one feature vector from the received mobility data, based on aggregation of two or more observations associated with the received mobility data;
clustering the plurality of cells, based on the extracted at least one feature vector, to generate one or more clusters of the plurality of cells;
classifying the one or more clusters as an active cluster or a passive cluster based on the mobility data of the one or more clusters;
determining a demand prediction for at least one cluster of the one or more clusters based on a distance between a sub-ordinate cell of the at least one cluster and a cluster center of the at least one cluster; and
displaying the demand predication for the at least one cluster as a map layer on a user interface of a user device, wherein the map layer comprises a graphical representation of the distance between the sub-ordinate cell of the at least one cluster and the cluster center of the at least one cluster,
wherein the plurality of cells of the at least one geographical location comprises a plurality of equally measured units.

17. The computer program product of claim 16, wherein to extract the at least one feature vector, the operations further comprise:
- extracting a plurality of numeric attributes from the aggregated two or more observations, wherein the plurality of numeric attributes include numerical data associated with one or more of counts, mean, max or frequency associated with the mobility data; and
- representing each of the plurality of numeric attributes into the at least one feature vector.

18. The computer program product of claim 16, wherein the operations further comprise normalizing each of the at least one feature vector based on one or more of length normalization, mean and standard normalization, or category normalization.

19. The computer program product of claim 16, wherein the operations further comprise clustering the plurality of cells of the at least one geographical region based on a count clustering method, wherein the plurality of cells are clustered as one or more of low value, medium value, or high value cells based on a threshold value of sum of counts of the at least one feature vector.

\* \* \* \* \*